(12) United States Patent
Francisco (10) Patent No.: US 7,764,760 B2
(45) Date of Patent: Jul. 27, 2010

(54) APPARATUS AND METHOD FOR MEASURING ROTATION DURING JET PUMP TENSIONING

(75) Inventor: Gregory Francisco, Fremont, CA (US)

(73) Assignee: General Electric Company, Schenectady, NY (US)

( * ) Notice: Subject to any disclaimer, the term of this patent is extended or adjusted under 35 U.S.C. 154(b) by 895 days.

(21) Appl. No.: 11/019,620

(22) Filed: Dec. 23, 2004

(65) Prior Publication Data
US 2006/0140330 A1 Jun. 29, 2006

(51) Int. Cl.
*G21C 19/28* (2006.01)
(52) U.S. Cl. ............... 376/372; 376/260; 376/392; 376/407; 29/252; 81/57.38
(58) Field of Classification Search ............ 376/372, 376/392, 407, 260, 252; 81/57.38, 46, 467, 81/468, 473, 465; 29/252
See application file for complete search history.

(56) References Cited

U.S. PATENT DOCUMENTS

| | | | | | |
|---|---|---|---|---|---|
| 1,537,657 | A | * | 5/1925 | Burch | 81/177.75 |
| 2,454,372 | A | * | 11/1948 | Billeter | 408/241 R |
| 2,501,931 | A | * | 3/1950 | Brown | 384/413 |
| 2,564,789 | A | * | 8/1951 | Moss | 33/551 |
| 2,829,439 | A | * | 4/1958 | Cunningham | 33/818 |
| 3,092,913 | A | * | 6/1963 | Bugge | 33/818 |
| 3,115,029 | A | * | 12/1963 | Better | 73/1.09 |
| 3,628,485 | A | * | 12/1971 | Gill et al. | 114/285 |
| 3,660,904 | A | * | 5/1972 | Steele et al. | 33/788 |
| 3,722,332 | A | * | 3/1973 | Jones | 81/57.38 |
| 3,823,755 | A | * | 7/1974 | Sheffield | 81/57.31 |
| 3,877,326 | A | * | 4/1975 | Kock et al. | 81/57.38 |
| 3,995,828 | A | * | 12/1976 | Orban | 254/29 A |
| 4,185,506 | A | * | 1/1980 | Exner et al. | 73/761 |
| 4,333,351 | A | * | 6/1982 | Bickford | 73/761 |
| 4,454,790 | A | * | 6/1984 | Rieben | 81/57.38 |
| 4,523,174 | A | * | 6/1985 | Oyama | 338/119 |
| 4,535,656 | A | * | 8/1985 | Orban | 81/57.38 |
| 4,582,456 | A | * | 4/1986 | Imai | 408/136 |
| 4,659,065 | A | * | 4/1987 | Simms | 254/29 A |
| 4,774,864 | A | * | 10/1988 | Dossier | 81/474 |

(Continued)

OTHER PUBLICATIONS

"Torque screw driver with a circular scale and the holder from ¼" hexagonal head" Catalog, 1990 ELFA Electronika AS; www.elfaelectronics.com.ua/cgi-bin/index.cgi?ec=10a6b4c.*

*Primary Examiner*—Rick Palabrica
(74) *Attorney, Agent, or Firm*—Harness, Dickey & Pierce, PLC (57) ABSTRACT

Systems and method for tensioning jet pump beam bolts in a nuclear reactor are disclosed. The nuclear reactor may include at least one jet pump with each jet pump having a jet pump beam and a jet pump beam bolt. The system may include an actuating apparatus and a tensioning apparatus. The actuating apparatus may include a socket member for engaging the jet pump beam bolts, a sleeve member for engaging a handling pole, and an actuator hex positioned between the socket member and the sleeve member. The tensioning apparatus may include a base block having an opening for accommodating the jet pump beam bolt, a top plate having an opening for accommodating the actuator hex, and a hydraulic actuator for providing tension to the jet pump beam bolt in accordance to measurements of the actuating apparatus.

16 Claims, 6 Drawing Sheets

U.S. PATENT DOCUMENTS

| | | | | |
|---|---|---|---|---|
| 4,808,976 A | * | 2/1989 | Kiefer et al. | 340/665 |
| 4,995,158 A | * | 2/1991 | Howell et al. | 29/723 |
| 5,070,589 A | * | 12/1991 | Howell et al. | 29/426.5 |
| 5,515,407 A | | 5/1996 | Bevilacqua et al. | |
| 5,589,640 A | * | 12/1996 | Butler | 73/761 |
| 5,689,537 A | * | 11/1997 | Hahn | 376/260 |
| 5,690,005 A | * | 11/1997 | Jung et al. | 81/57.3 |
| 5,758,558 A | * | 6/1998 | Squires | 83/522.18 |
| 5,797,708 A | * | 8/1998 | Bencic | 408/112 |
| 5,809,100 A | * | 9/1998 | Butler | 376/258 |
| 6,434,208 B1 | | 8/2002 | Erbes et al. | |
| 6,625,244 B2 | | 9/2003 | Paillaman et al. | |
| 2002/0114421 A1 | * | 8/2002 | Erbes et al. | 376/260 |

* cited by examiner

RELATED ART

FIG. 3

RELATED ART

APPARATUS AND METHOD FOR MEASURING ROTATION DURING JET PUMP TENSIONING

BACKGROUND OF INVENTION

1. Field of the Invention

This invention relates generally to apparatus and method for measuring rotation during jet pump tensioning in a nuclear reactor pressure vessel.

2. Description of Related Art

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and supported against two opposing rigid contacts within restrainer brackets by a gravity actuated wedge. The inlet mixers are each held in place at the top end by a preloaded beam. To secure the assembly, the jet pump beam is assembled with a high preload, applied by installing the jet pump beam bolt with a hydraulic tensioner.

High static and dynamic jet pump flow loads on the inlet mixer can, under some conditions, such as insufficient beam preload, cause oscillating motion and detrimental vibration excitation in the jet pump. The resultant increased vibration levels and corresponding vibration loads on the piping and supports can cause jet pump component degradation from wear and fatigue. Extreme component degradation can require plant shutdown. To assure the required preload is maintained, the beam bolt is securely locked to prevent loosening after tensioning is completed. The locking device design and engagement actuation must not interfere with operation of the jet pump tensioner. Accordingly, breaker poles, typically 2 inch in diameter, are used to lower the jet pump tensioner onto the beam bolt. The breaker poles may be used to prevent and/or reduce wind-up over the approximately 80 ft of coverage. However, the heavy breaker poles generally require the use of an overhead crane to assembly and transport the tools to its proper location. Thus, the employment of the overhead crane is time consuming and a laborious task for operators.

SUMMARY OF THE INVENTION

The present invention may provide a method and system for measuring rotation of a jet pump beam bolt during a tensioning process. The apparatus may further provide an accurate, precise rotation measurement.

Further, critical path time may be saved by reducing the assembly of heavy tools. In other words, overhead cranes may be eliminated since breaker poles may not be employed in the present invention. Accordingly, overhead cranes may be used in other plant shut-down procedures, which may save critical path time. Further, because breaker poles may not be used, there is no need for shipping, testing, and handling of the jet pump breaker poles.

Exemplary embodiments of the present invention may provide an actuating apparatus that may measure tension on jet pump beam bolts in a nuclear reactor. The actuating apparatus may include a socket member for engaging the jet pump beam bolts, a sleeve member for engaging a handling pole, and an actuator hex positioned between the socket member and the sleeve member, wherein the actuator hex may measure the amount of tension applied on the jet pump beam bolts.

In other exemplary embodiments, the actuating apparatus may provide a degree wheel on the actuator hex for indicating the degree of rotation of the beam bolts.

In yet other exemplary embodiments, the degree wheel may be a degree dial.

In yet other exemplary embodiments, the degree wheel may measure the rotation in increments of ±5 degrees.

In other exemplary embodiments, the actuator hex may correspond to an opening in a tensioner so as to prevent movement of the actuator.

In other exemplary embodiments, the socket member may be a drive-deep impact type.

In other exemplary embodiments, the sleeve member may include a drain hole and a plurality of pin holes.

Exemplary embodiments of the present invention may provide a system for tensioning jet pump beam bolts in a nuclear reactor. The nuclear reactor may include at least one jet pump with each jet pump comprising a jet pump beam and a jet pump beam bolt. The system may include an actuating apparatus and a tensioning apparatus. The actuating apparatus may include a socket member for engaging the jet pump beam bolts, a sleeve member for engaging a handling pole, and an actuator hex positioned between the socket member and the sleeve member. The tensioning apparatus may include a base block having an opening for accommodating the jet pump beam bolt, a top plate having an opening for accommodating the actuator hex, and a hydraulic actuator for providing tension to the jet pump beam bolt in accordance to measurements of the actuating apparatus.

In other exemplary embodiments, the system may further provide a degree wheel on the actuator hex for indicating the degree of rotation of the beam bolts.

In other exemplary embodiments, the opening in the top plate may be a hex-like shape.

In yet other exemplary embodiments, the top plate may further include a lifting member wherein the lifting member may include a handle for lowering the tensioning apparatus.

In other exemplary embodiments, the tensioning apparatus may further include tension hooks for hooking onto the jet pump beam.

In yet other exemplary embodiments, the tension hooks may be controlled by a pneumatic cylinder.

Exemplary embodiments of the present invention may provide a method for tensioning jet pump beam bolts in a nuclear reactor. The nuclear reactor may include at least one jet pump with each jet pump comprising a jet pump beam and a jet pump beam bolt. The method may include mounting a tensioning apparatus on the jet pump beam bolts, engaging an actuating apparatus on the beam bolt, and rotating the actuating apparatus to tighten the beam bolts.

In other exemplary embodiments, the method may further include providing hydraulic pressure to pressurize the tensioner.

In other exemplary embodiments, the mounting the tensioning apparatus may further include engaging tension hooks to the jet pump beams.

In other exemplary embodiments, rotating the beam bolts may be rotated by a handling pole connected to the sleeve member.

In yet other exemplary embodiments, the rotation may be clockwise.

In yet other exemplary embodiments, the rotation may be 50±5 ft-lbs. (67.8±6.8 NM) of torque.

In other exemplary embodiments, the method may include positioning a camera to record the measurement of the tension applied on the jet pump beam bolt.

These and other features and advantages of this invention are described in, or are apparent from, the following detailed description of various exemplary embodiments of the method and systems according to the invention.

BRIEF DESCRIPTION OF THE DRAWINGS

The present invention will become more apparent by describing, in detail, exemplary embodiments thereof with reference to the attached drawings, wherein like procedures are represented by like reference numerals, which are given by way of illustration only and thus do not limit the exemplary embodiments of the present invention.

DETAILED DESCRIPTION OF EXEMPLARY EMBODIMENTS

It should be noted that these Figures are intended to illustrate the general characteristics of method and apparatus of exemplary embodiments of this invention, for the purpose of the description of such exemplary embodiments herein. These drawings are not, however, to scale and may not precisely reflect the characteristics of any given embodiment, and should not be interpreted as defining or limiting the range of values or properties of exemplary embodiments within the scope of this invention. The relative dimensions and size of jet pump assembly may be reduced or exaggerated for clarity. Like numerals are used for liked and corresponding parts of the various drawings.

Exemplary embodiments of the present invention may provide an apparatus for measuring rotation of a jet pump beam bolt during a tensioning process. The apparatus may further provide an accurate, precise rotation measurement. Further, critical path time may be saved by reducing the assembly of heavy tools.

Figure 1:
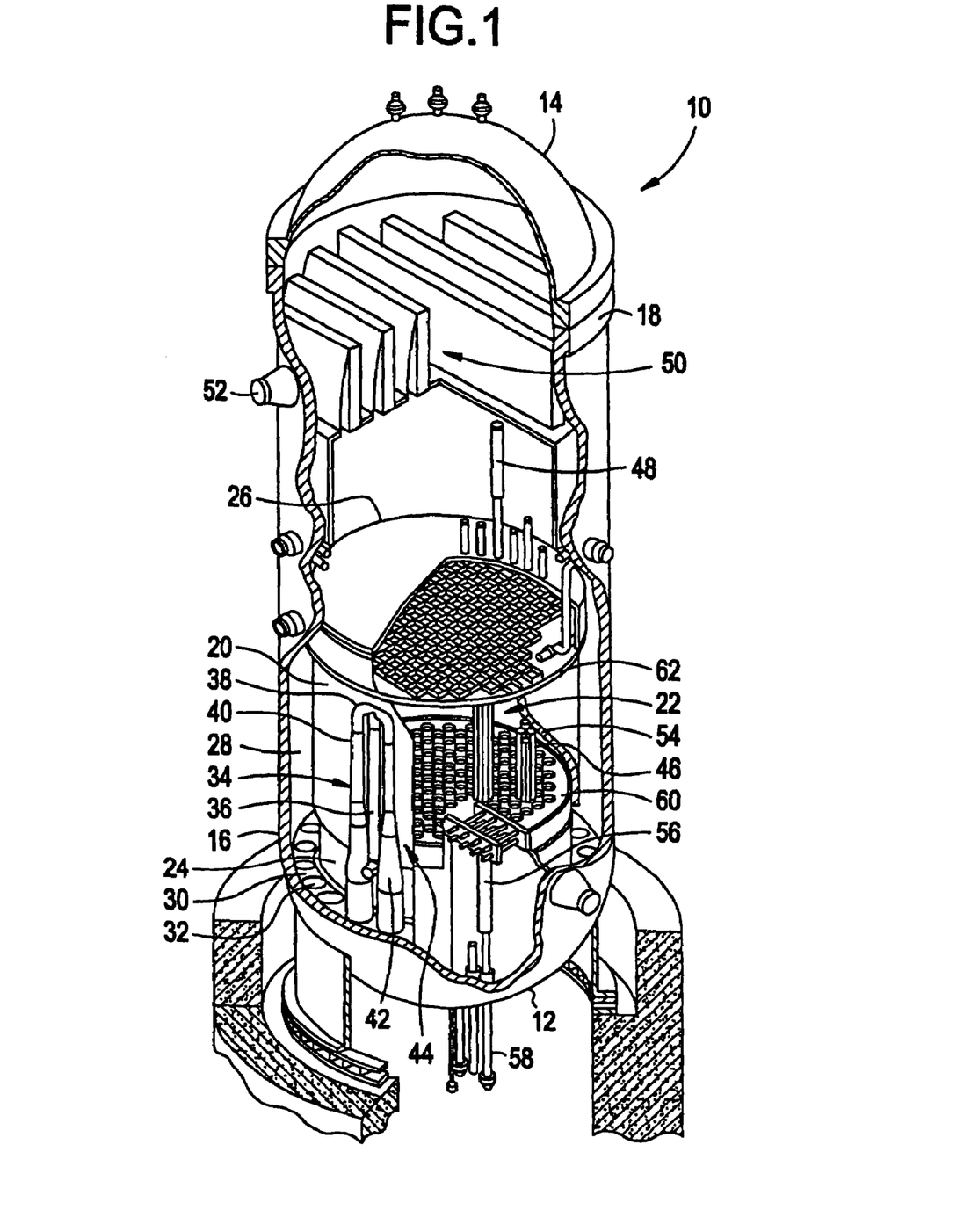
FIG. 1 is a sectional view, with parts cut away, of a boiling water nuclear reactor pressure vessel in accordance with an exemplary embodiment of the present invention.

FIG. 1 is a sectional view, with parts cut away, of a boiling water nuclear reactor pressure vessel in accordance with an exemplary embodiment of the present invention. As shown in FIG. 1, a boiling water nuclear reactor pressure vessel (RPV) 10 is disclosed. The RPV 10 may have a generally cylindrical shape and is closed at one end by a bottom head 12 and at its other end by a removable top head 14. A side wall 16 extends from bottom head 12 to top head 14. Side wall 16 includes a top flange 18. Top head 14 may be attached to the top flange 18. A cylindrically shaped core shroud 20 surrounds a reactor core 22. Shroud 20 may be supported at one end by a shroud support 24 and may include a removable shroud head 26 at the other end. An annulus 28 is formed between shroud 20 and side wall 16. A pump deck 30, which may have a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 may include an inlet mixer 40, and a diffuser 42. Inlet riser pipe 36 and the two connected jet pumps 34 may form a jet pump assembly 44.

Figure 2:
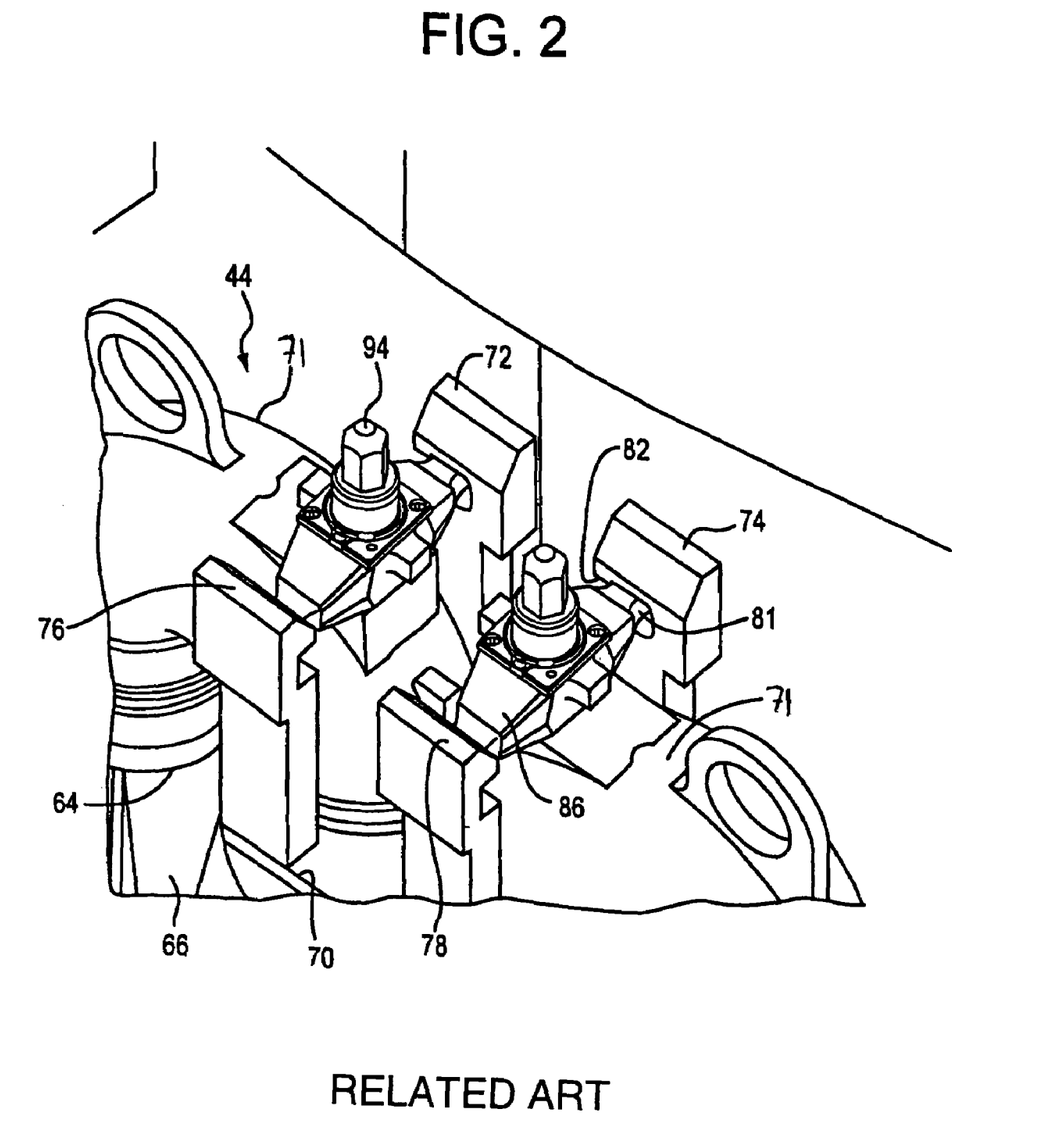
FIG. 2 is a perspective view of a jet pump assembly in accordance with an exemplary embodiment of the present invention.

FIG. 2 is a perspective view of a jet pump assembly in accordance with an exemplary embodiment of the present invention. As shown in FIG. 2, the jet pump assembly 44 may include a riser pipe 36 coupled to a pair of jet pumps 34 by transition assembly 38. Each jet pump 34 includes a jet pump nozzle 64, a suction inlet 66, an inlet mixer 40, and a diffuser 42 (shown in FIG. 1). The jet pump nozzle 64 may be positioned in the suction inlet 66 which may be located at a first end (not shown) of inlet mixer 40. The transition assembly 38 may include a base piece 70 and two elbows 71. Each elbow 71 is coupled to a jet pump nozzle 64. Locking arms 72, 74, 76, and 78 extend from the transition assembly base piece 70. Connected between the locking arms 72, 74, 76, and 78 is a jet pump beam 86. In an exemplary embodiment, the jet pump beam 86 engages between support arms 72 and 76, and an substantially identical jet pump beam 86 engages between support arms 74 and 78. The jet pump beam 86 includes a tongue member 81 at the end which engages notches 82 in the locking arms 72, 74, 76, and 78 for preventing and/or reducing movement (e.g., rotational) of the beam bolt 94. The beam 86 may engage the locking arms 72, 74, 76, and 78 by sliding the tongue member 81 into the notches 82.

Figure 3:
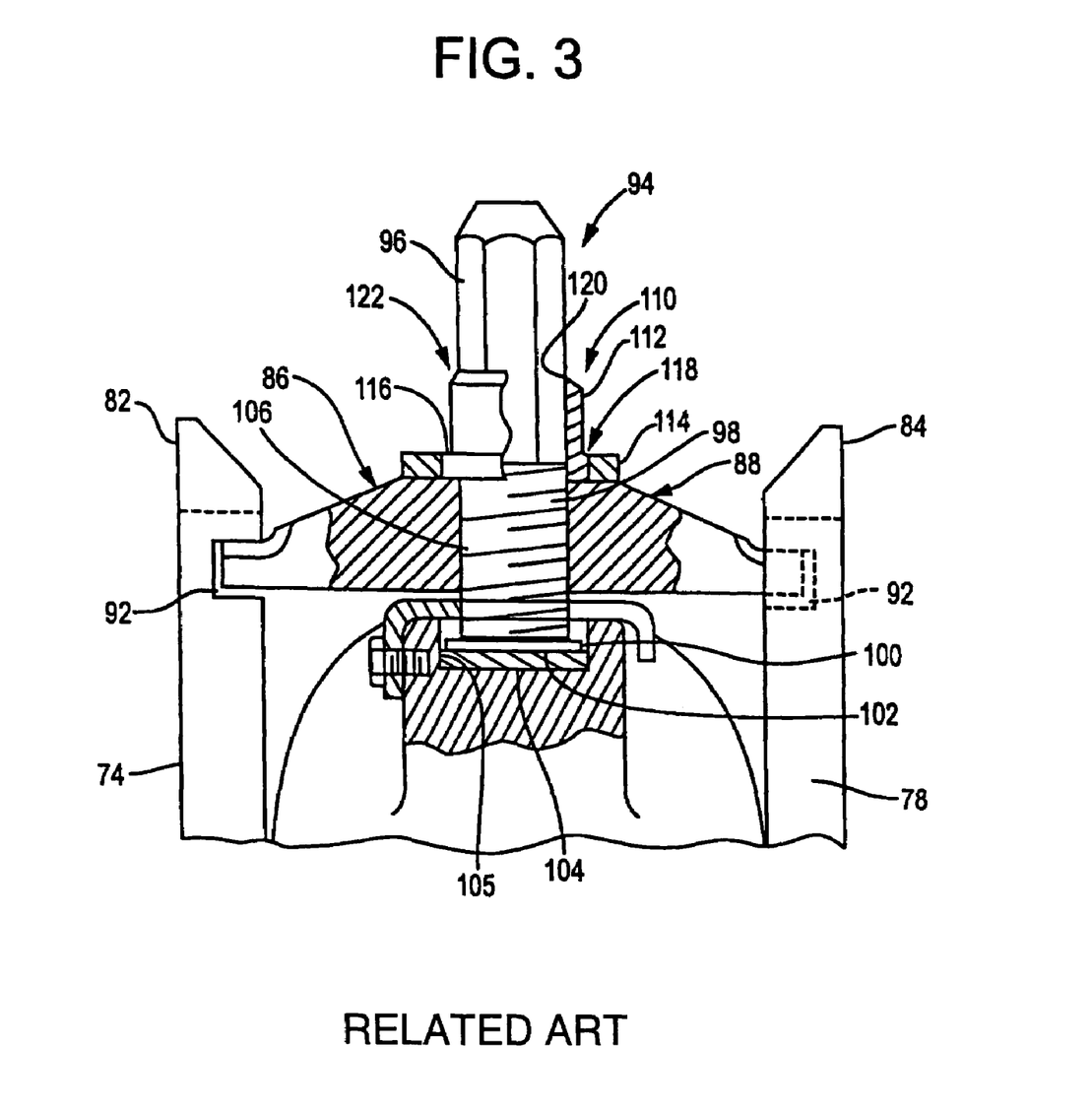
FIG. 3 is a side view of a jet pump beam in accordance with an exemplary embodiment of the present invention.

Referring to FIG. 3, jet pump beam 86 includes a raised central portion 88 and trunions 90. The ends of jet pump beam 86 are supported in the notches 82 located in locking arms 72, 74, 76, and 78. A beam bolt 94 may include a multisided head 96, a threaded portion 98, and a butt end 100 including a lower bearing surface 102 which bears against a disc 104 seated in a counter bore 105 of elbow 71. Beam bolt 94 threadedly engages a threaded bolt opening 106 in jet pump beam 86.

A locking assembly 110 prevents beam bolt 94 from loosening. Locking assembly 110 may include a locking sleeve 112 and a lock plate 114. Locking sleeve 112 may include a base portion 116 at a first end 118 and a bore 120 extending from first end 118 to a second end 122. A bore 120 may be sized and shaped to matingly receive beam bolt head 96. The locking operation of the beam bolt 94 may be described in U.S. Pat. No. 6,434,208, assigned to General Electric, which is hereby incorporated by reference in its entirety.

Figure 4:
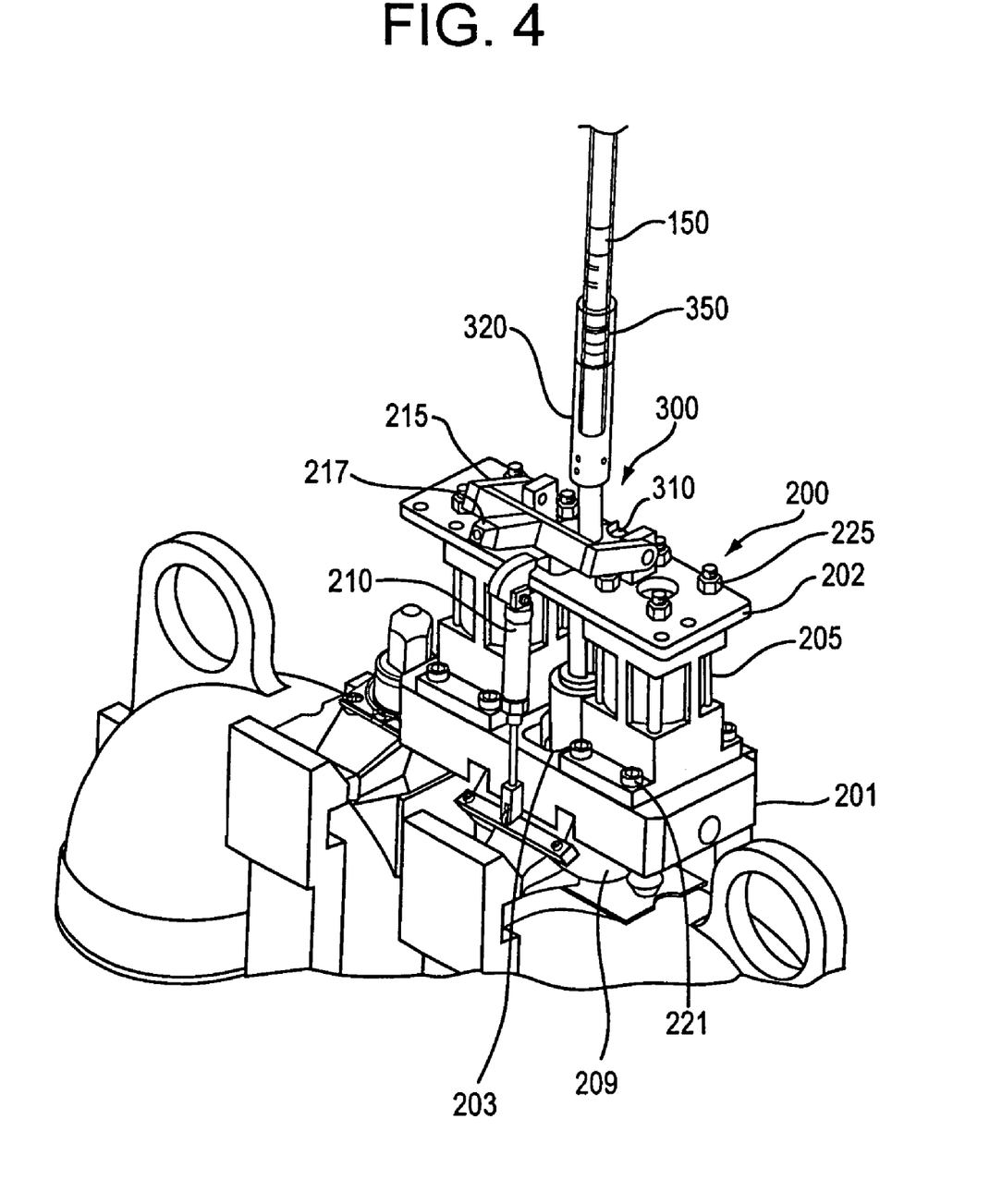
FIG. 4 is a perspective view of a tensioner in the jet pump assembly in accordance with an exemplary embodiment of the present invention.

FIG. 4 is a perspective view of a tensioner in the jet pump assembly in accordance with an exemplary embodiment of the present invention. As shown in FIG. 4, a tensioner 200 is installed on the beam bolt 94 to provide tension. The tensioner 200 may include a base block 201, an upper plate 202, a hydraulic cylinder 205 between the base block 201 and upper plate 202, tension hooks 209, a pneumatic-cylinder 210, and a lifting member 215. The base block 201 includes a beam bolt opening 203. The beam bolt opening 203 may be positioned, for example, in a central location of block 201. The beam bolt opening 203 should be large enough so that the socket 315 of the degree wheel actuator 300 may extend there through. As an exemplary embodiment, the opening 203 may have a diameter of 1 7/16 inch. Provided on the base block 201 is also a plurality of openings for accommodating hex-bolts 221. The hex-bolts 221 may be used for attaching a lower portion of hydraulic cylinder 205 to the base block 201.

However, it should be appreciated that other types of bolts and/or other attachment means may be employed to attach the actuator 205 to the base block 201. A hex-shaped wrench (not shown) may be used to tighten and loosen the hex-bolts 221.

The hydraulic cylinders 205 produce the force to cause tensioning. The pressure generated by the hydraulic cylinders 205 is approximately 25,000 pounds at a hydraulic pressure of approximately 2,700 psi.

Attached on top of the hydraulic cylinders 205 is top plate 202. The top plate 202 may include a plurality of bolt openings 225 for accommodating bolts 223 and an opening (not shown) for accommodating an actuator hex 312 of the degree wheel actuator 300. The opening may be a six-sides hole that may accommodate the similar size of the actuator hex 312 so as to prevent and/or reduce rotation of the degree wheel actuator 300 once installed. However, it should be appreciated that other shapes may be formed to accommodate the degree wheel actuator. Further, attached on the top plate 202 is a lifting member 215. The lifting member 215 may include a U-shaped handle 217. The U-shaped handle 217 may move from a up right position to a horizontal position in order to allow the installation of the degree wheel actuator, the torque multiplier and the unlatching tool Attached to the bottom of the base block 201 are the jet pump beam hooks 209. These hooks are actuated by the pneumatic cylinder 210 to engage to the ears on the jet pump beam, allowing the beam to be tensioned.

A connector member 350 is connected to sleeve 320 of the degree wheel actuator 300 at one end and configured to be connected to the other end of a handling pole 150. However it should be appreciated that the connector member may be configured to be connected to other devices, such as, but not limited to ropes, a crane, or an automatic tool manipulator.

Figure 5:
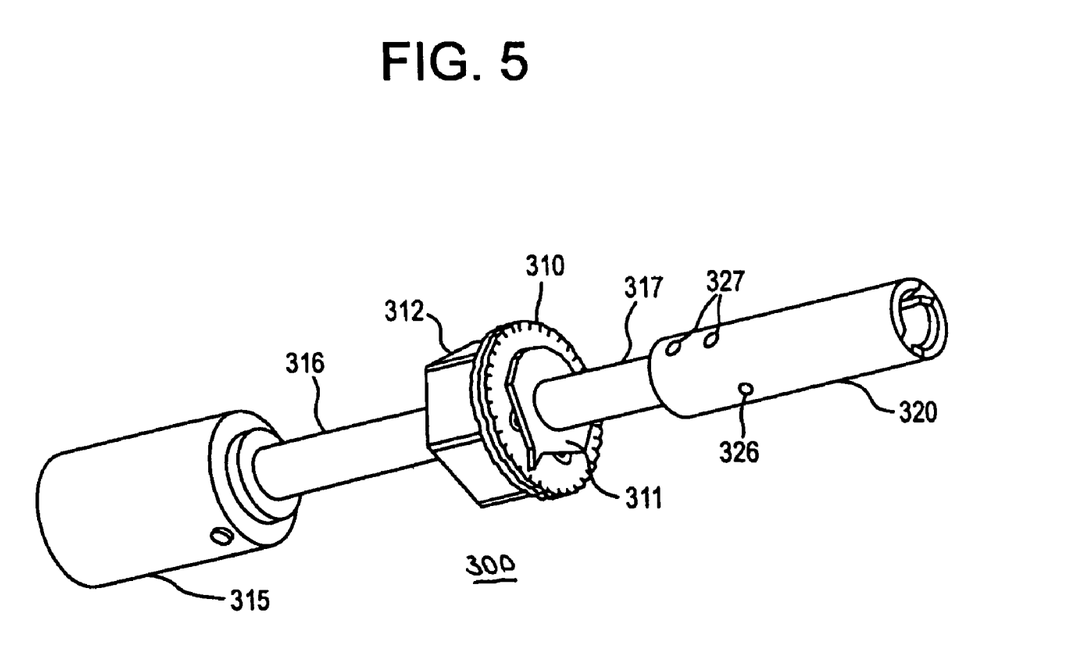
FIG. 5 is a perspective view of a degree wheel apparatus in accordance with an exemplary embodiment of the present invention.
Figure 6A:
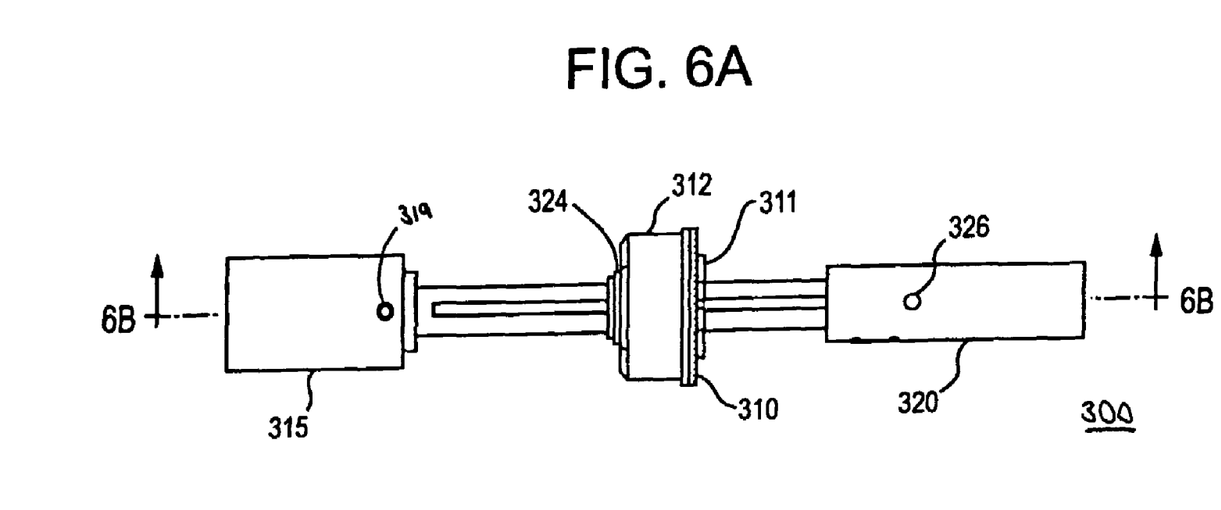
FIGS. 6A and 6B are schematic views of the degree wheel apparatus of FIG. 4.
Figure 6B:
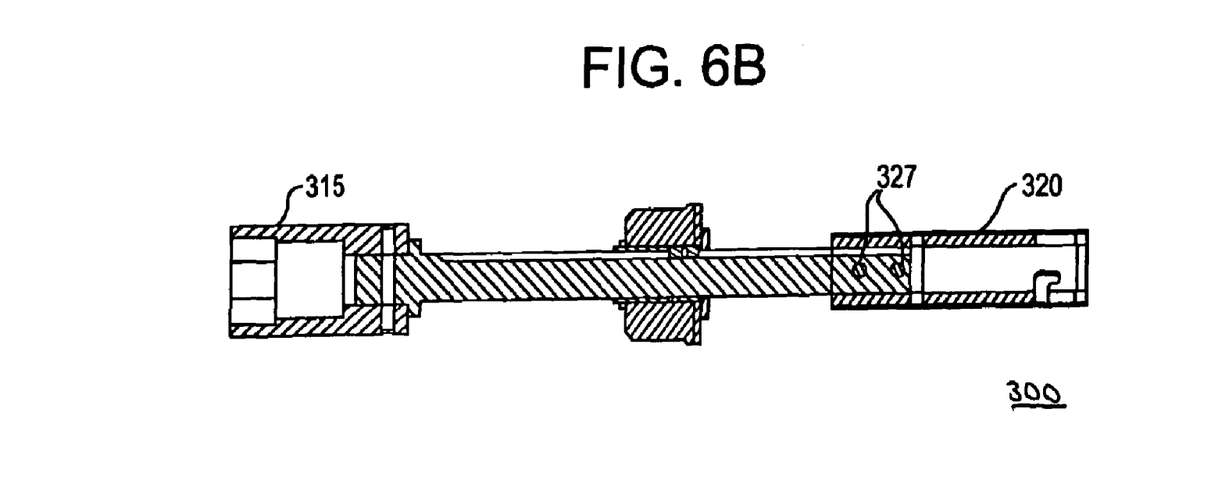

Referring to FIG. 5 and FIGS. 6A and 6B, the degree wheel actuator 300 is illustrated. The degree wheel actuator 300 may include a socket 315 at one end, a sleeve 320 at the other end, a socket extension 316, an actuating hex 312, a degree wheel 310, and a sleeve extension 317.

The socket 315 may engage the beam bolt 94 for providing rotation. The socket 315 may be a drive-deep impact type socket, having an internal dimension, for example, 1 7/16×1 inch. Further, the socket may be, for example, but not limited to, 3.2 inches in length (as shown in FIG. 6B). However, it should be appreciated that other dimensions of the socket may be employed. The socket 315 may also include a pin 319 (as shown in FIG. 6A). The pin 319 may be, for example, a spirol wound roll type, having a ¼ inch diameter this pin retains the socket 315 to the extension 316.

An extension 316 is attached and extends outwardly from the socket. The extension 316 may be connected to a washer 324 on the actuating hex 312. The washer 324 may reduce and/or prevent rotation of the extension. The actuation hex 312 may be, but not limited to a six-sided hex so as to correspondingly engage the shape of the opening (not shown) in the top plate 202 of the tensioner 200. This prevents and/or reduces the degree wheel actuator 300 from rotating. Provided on the actuation hex 312 may be a degree wheel 310. Provided on the degree wheel 310 is a wheel dial 311 for indicating measurement of rotation. The degree wheel 310 may measure the rotation of the beam bolt in increments of, for example, every ±5 degree. However, it should be appreciated that other degree measurements may be used in accordance to the application. The degree wheel 310 corresponds to the amount of tension applied by the tensioner 200 and may provide an accurate, precise measurement of the rotation of the beam bolt 94. Further, because the degree measurement may be read (e.g., using a camera system) while the tensioner 200 is installed on the jet pump assembly, the use of external tools, such as an overhead crane may be eliminated. That is, a small handling pole operated by an operator may be employed rather than the heavier breaker poles used with an overhead crane. As a result, considerable amount of time and critical path time may be saved because shipping, testing and handling of the jet pump breaker poles are not required.

Referring to FIGS. 6A and 6B, the sleeve member 320 may include a drain hole 326 and a plurality of pin holes 327. The drain hole 326 is provided to flush out any fluid trapped in the sleeve 320. The drain hole 326 may have a diameter of ¼ inch. The pin holes 327 are provided to securely attach the degree wheel actuator 300 to the handling pole 150. The J slot on the sleeve is to attach a small handling pole to the tool the pins on the small handling pole slide into the long slot as the pins round the bottom of the slot a nut is run down on the small handling pole holding the pin tight into the bottom of the short slot. The small handling pole can now accurately manipulate the tool.

It should be understood by one of ordinary skilled in the art that the size of the drain hole and pin holes may vary according to the application used.

The operation of tensioning the beam bolt 94 will now be described. First, attach the jet pump tensioner 200 to a hoist, such as a monorail hoist. The tensioner 200 is attached to a cable (not shown) on the lifting member 215, particularly on the handle 217, and lowered onto the jet pump assembly 44. The hooks 209 on the tensioner 200 are moved in the 'retract' position by applying pressure, approximately 100 psig (3.45 MPa) on the Air cylinder 205. Then, lower the tensioner 200 into the RPV 10 annulus and guide the tensioner 200 over the jet pump assembly 44 such that the beam bolt 94 protrudes into the opening 203 in the base block 201, and that the hooks 209 straddle the beam 86. If required, move the hoist cable and the tensioner 200 to obtain proper seating of the tensioner 200 on the jet pump assembly 44. Once the tensioner 200 is properly oriented on the jet pump assembly 44, the tension hooks 209 should be engaged to the beam 86 by moving the air control handle in the control station to the 'extend' position. Then disengage the actuating pole, if used so that the handle 217 on the lifting member 215 rests in the horizontal position. Proper installation of the hooks 209 may be executed by lowering a surveillance equipment, such as a camera to verify that the hooks 209 are properly installed on the beam 86.

Next, lower the degree wheel actuator 300 into the hex opening on the tensioner 200 so as to engage the beam bolt 94. Prior to engaging the beam bolt 94, position the degree dial 311 at zero (0) degrees+60−0. Then, move the hydraulic valve handle to the 'extend' position and pressurize the hydraulic cylinder 202 in the tensioner 200 to 2550±50 psi (17.58±0.34 MPa) or 2700±50 psi (18.62±0.34 MPa). At the tensioner control unit, reduce the hydraulic pressure to zero. Then, move the hydraulic valve handle in the control station to 'retract' position, and pressure the hydraulic cylinder 202 in the tensioner 200 to 500 psi 93.45 MPa). Rotate the beam bolt 94 in a clockwise (CW) direction and apply 50±5 ft-lbs. (67.8±6.8 NM) of torque. Then, position the camera to record the position of the degree dial 311 (e.g., hold the 50±5 ft-lbs. (67.8±6.8 NM) of torque and record the position). This provides the initial reference point for measurement of the beam bolt rotation.

Next, move the hydraulic valve handle in the control station to the 'extend' position and pressurize the tensioner 200 to 2550±50 psi (17.58±0.34 MPa) or 2700±50 psi (18.62±0.34 MPa). Then, rotate the beam bolt 94 clockwise (CW) and tighten the bolt to 50±5 ft-lbs. (67.8±6.8 NM) of torque. At the tensioner control unit, use the hydraulic pump release valve to reduce the pressure to approximately 300 psi (2.07 MPa). Then, close the release valve, and re-pressurize the tensioner 200 to 2550±50 psi (17.58±0.34 MPa) or 2700±50 psi (18.62±0.34 MPa). Re-tighten the beam bolt 94 clockwise (CW) to 50±5 ft-lbs. (67.8±6.8 NM) of torque. Repeat until the specified clockwise torque of 50±5 ft-lbs. (67.8±6.8 NM) causes no further bolt rotation.

While maintaining pressure on the tensioner 200, apply up to 75 ft-lbs.±5 ft-lbs. (101.7±6.8 NM) counterclockwise (CCW) to seat the ratchet into a 'tooth to tooth' position. At the tensioner control unit, use the hydraulic pump release valve to reduce pressure to approximately 300 psi (2.07 MPa). Then, position the camera to record the position of the degree dial 311 (e.g., hold the 50±5 ft-lbs (67.8±6.8 NM) of torque in the CW direction and record the position). This provides the finish reference point for measurement of the beam bolt rotation.

Although the preferred embodiments have been described in the field of power generation, particularly, nuclear reactor vessels, one of ordinary skilled in the art would appreciate that the present invention may be applicable where accurate measurement of tensioning is required.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. An actuating apparatus that measures rotation of a jet pump beam bolt in a nuclear reactor, comprising:
   a socket member for engaging the jet pump beam bolt;
   a sleeve member configured to engage a handling pole, the sleeve member being rigidly connected to the socket member;
   an actuator hex rigidly connected between the socket member and the sleeve member in an axial direction, the actuator hex not rigidly connected to the socket member in a rotational direction and not rigidly connected to the sleeve member in the rotational direction, the actuator hex configured to engage a stationary tensioner so that as the socket member and the sleeve member rotate in the rotational direction, the actuator hex remains stationary;
   a displacement wheel rigidly attached to the actuator hex; and
   a displacement dial rigidly attached to the sleeve member or socket member, the displacement dial corresponding to the displacement wheel so as to permit rotational displacement measurement.

2. The actuating apparatus of claim 1, wherein the displacement wheel includes a degree wheel on the actuator hex for indicating the degree of rotation of the beam bolt.

3. The actuating apparatus of claim 1, wherein the displacement dial includes a degree dial corresponding to the displacement wheel.

4. The actuating apparatus of claim 2, wherein the degree wheel demarcates angular rotation in increments of 5 degrees.

5. The tension apparatus of claim 1, wherein the socket member is a drive-deep impact type.

6. The tension apparatus of claim 1, wherein the sleeve member includes a drain hole and a plurality of pin holes.

7. A system for tensioning jet pump beam bolts in a nuclear reactor, the nuclear reactor comprising at least one jet pump with each jet pump comprising a jet pump beam and a jet pump beam bolt, the system comprising:
   an actuating apparatus including
      a socket member for engaging the jet pump beam bolt,
      a sleeve member configured to engage a handling pole, the sleeve member being rigidly connected to the socket member,
      an actuator hex rigidly connected between the socket member and the sleeve member in an axial direction, the actuator hex not rigidly connected to the socket member in a rotational direction and not rigidly connected to the sleeve member in the rotational direction, the actuator hex configured to engage a stationary tensioner so that as the socket member and the sleeve member rotate in the rotational direction, the actuator hex remains stationary,
      a displacement wheel rigidly attached to the actuator hex, and
      a displacement dial rigidly attached to the sleeve member or socket member, the displacement dial corresponding to the displacement wheel so as to permit displacement measurement; and
   the stationary tensioner including
      a base block having an opening for accommodating the jet pump beam bolt,
      a top plate having an opening for accommodating the actuator hex, and
      a hydraulic actuator for providing tension to the jet pump beam.

8. The system of claim 7, wherein the displacement wheel includes a degree wheel on the actuator hex for indicating the degree of rotation of the beam bolt.

9. The system of claim 7, wherein the displacement dial includes a degree dial corresponding to the displacement wheel.

10. The system of claim 8, wherein the degree wheel demarcates angular rotation in increments of 5 degrees.

11. The system of claim 7, wherein the opening in the top plate is a hex-like shape.

12. The system of claim 7, wherein the top plate further comprises a lifting member, the lifting member includes a handle for lowering the tensioning apparatus.

13. The system of claim 7, wherein the tensioning apparatus further comprises tension hooks for hooking onto the jet pump beam.

14. The system of claim 13, wherein the tension hooks are controlled by a pneumatic cylinder.

15. The actuating apparatus of claim 1, wherein the displacement dial is rigidly attached to the sleeve member or socket member in the rotational direction, and wherein the displacement dial corresponds to the displacement wheel so as to permit rotational displacement measurement of the jet pump beam bolt.

16. The system of claim 7, wherein the displacement dial is rigidly attached to the sleeve member or socket member in the rotational direction, and wherein the displacement dial corresponds to the displacement wheel so as to permit rotational displacement measurement of the jet pump beam bolt.

* * * * *